(12) United States Patent
Lai et al.

(10) Patent No.: US 8,135,771 B2
(45) Date of Patent: Mar. 13, 2012

(54) DIGITAL SIGNAL PROCESSOR CLUSTERING IN INTEGRATED MEDIA-SERVICES GATEWAYS

(75) Inventors: Cheng-Jia Lai, Mountain View, CA (US); Prasad Miriyala, Union City, CA (US); Jing Li, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 12/509,816

(22) Filed: Jul. 27, 2009

(65) Prior Publication Data

US 2011/0022652 A1 Jan. 27, 2011

(51) Int. Cl.
*G06F 15/16* (2006.01)
(52) U.S. Cl. ........................................... 709/202
(58) Field of Classification Search .................. 709/202
See application file for complete search history.

(56) References Cited

U.S. PATENT DOCUMENTS

| | | | |
|---|---|---|---|
| 6,240,086 B1 * | 5/2001 | Morgan et al. | 370/352 |
| 6,400,925 B1 * | 6/2002 | Tirabassi et al. | 455/12.1 |
| 6,744,741 B1 * | 6/2004 | Ju et al. | 370/260 |
| 6,965,936 B1 * | 11/2005 | Wipfel et al. | 709/224 |
| 7,675,921 B2 * | 3/2010 | Igarashi | 370/395.53 |
| 7,761,691 B2 * | 7/2010 | Tang et al. | 712/217 |
| 7,805,591 B2 * | 9/2010 | Ljungberg | 712/35 |
| 2002/0111977 A1 | 8/2002 | Keay | |
| 2002/0133611 A1 * | 9/2002 | Gorsuch et al. | 709/231 |
| 2003/0169652 A1 * | 9/2003 | Koh | 369/44.29 |
| 2005/0025170 A1 * | 2/2005 | Po et al. | 370/431 |
| 2005/0210220 A1 | 9/2005 | Ljungberg | |
| 2008/0077666 A1 * | 3/2008 | Sekaran et al. | 709/204 |
| 2010/0293043 A1 * | 11/2010 | Atreya et al. | 705/14.4 |

* cited by examiner

*Primary Examiner* — Faruk Hamza
*Assistant Examiner* — Benjamin Ailes
(74) *Attorney, Agent, or Firm* — Tucker Ellis & West LLP (57) ABSTRACT

A Digital Signal Processor (DSP) cloud architecture for clustering DSP resources across multiple integrated media-services gateways. The control plane components use peer-to-peer overlay connections for DSP resource management. The data plane components use a Virtual Local Area Network (VLAN) for media stream packet processing.

20 Claims, 7 Drawing Sheets

BP: backplane, G: GigE port, GX: GigE switch, MV: Montalvo/PVDM-NG

DIGITAL SIGNAL PROCESSOR CLUSTERING IN INTEGRATED MEDIA-SERVICES GATEWAYS

TECHNICAL FIELD

The present disclosure relates generally to Digital Signal Processor (DSP) media service provisioning.

BACKGROUND

Integrated media-services gateways in communication networks offer various media services such as transcoding and conferencing in audio and video. These compute intensive services are offered per media stream, and thus are typically handled by embedded Digital Signal Processors (DSPs) instead of by the Central Processor Units (CPU) in those gateways. Using DSPs for media services offloads the gateway host's CPU to achieve higher performance and greater throughput.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, comprising central processing logic and at least one digital signal processing logic. The central processing logic is configured to communicate with a central processing logic of a second server employing a peer to peer communication protocol. The central processing logic is configured to communicate with a digital signal processing logic associated with the second server via a virtual local area network. Then at least one digital signal processor is configured to communicate with the central processing logic of the second server via a virtual local area network.

In accordance with an example embodiment, there is disclosed herein a method comprising establishing a peer to peer connection between a central processing unit associated with a first server and a central processing unit associated with a second server. A layer 2 virtual local area network connection is established between the central processing unit associated with the first server and a digital signal processor associated with the second server. A layer 2 virtual local area network connection is established between a digital signal processor associated with a first server and the central processing unit associated with the second unit.

In accordance with an example embodiment, there is disclosed herein logic encoded on at least one tangible media for execution and when executed operable to establishing a peer to peer connection between a first central processing unit associated with a first server and a central processing unit associated with a second server. A layer 2 virtual local area network connection with is established with the central processing unit associated with the first server and a digital signal processor associated with the second server. A layer 2 virtual local area network connection is established between a digital signal processor associated with a first server and the central processing unit associated with the second unit. The central processing unit associated with the first server detects a failure of the central processing unit of the second server, and continues to communicate with the digital signal processor associated with the second server via the layer 2 virtual local area network responsive to detecting the failure of the central processing unit associated with the second server.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a Digital Signal Processor (DSP) Cloud as a system architecture for clustering DSP resources across multiple integrated media-services gateways. A DSP Cloud as described in an example embodiment herein provides high availability of media services against failures of gateway host Central Processor Units (CPUs), and facilitates the deployment of load-balancing mechanisms among the gateways based on real-time measurements. The DSP cloud uses layer-2 VLAN (Virtual Local Area Network) interconnections for fast DSP packet redirection between gateways, and layer-4 peer-to-peer overlay connections to cooperatively manage DSP resources amongst the gateways. The external behavior of DSP Cloud mimics a single media resource device that is registered with a control agent to offer DSP media services, but reporting the aggregate DSP capacities in the cluster. The control agent uses a request and response message pair to allocate a DSP resource from the DSP Cloud for a multimedia stream, e.g. a stream with Real Time Protocol (RTP) packets. RTP packets in the stream can start to flow in and out of the DSP Cloud to receive the media service at the allocated DSP.

In an example embodiment, a DSP Cloud deploys multiple gateways which collectively act like a single gateway. One of the gateways in DSP Cloud is elected to be the proxy gateway which will keep registration with the control agent. The proxy gateway acts on behalf of all those gateways, for example to announce the availability of their DSP media services in aggregation. If the elected gateway fails, the failure will be detected by a keep-alive timeout and replaced by one of the remaining gateways. If a gateway CPU crashes or reboots, any remaining gateway CPU can still use the layer-2 VLAN to send a packet to a DSP inside the failed gateway, provided that the DSP is still operating normally and has direct access to the VLAN. Thus, a DSP inside a gateway within a failed CPU remains available to other gateways, even while the CPU is not functioning. As such, DSP Cloud provides a high availability of DSP media-services by maintaining the same aggregate DSP capacities even while a gateway CPU has failed or experiences in-service software upgrade (ISSU). In addition, DSP clustering can facilitate load-balancing that can dynamically take into account the runtime load measurements of gateways, which is otherwise difficult for the control agent to monitor at runtime.

To describe the system architecture of a DSP Cloud, the concept of a Control Plane (CP) and a Data Plane (DP) are employed. A CP is employed for describing DSP resource management and communication with peer gateways and the control agent. A DP is used for runtime packet processing with DSP media services.

In an example embodiment, a control plane is constructed employing peer-to-peer overlay connections between the gateways in a DSP Cloud, using layer-4 (L-4) protocols such as TCP or UDP. The overlay connections are employed for exchanging messages between those gateways, similar to routing messages exchange. The simplest implementation can be a ring, balanced tree, or complete graph, configured manually or even automatically with some algorithm to maintain the connectivity with respect to runtime insertion, removal, and failures of gateways. A DSP cluster can use a simple election algorithm, e.g. by the lowest numeric value of gateway IP addresses, to designate the proxy gateway that registers the aggregate DSP capacities with the control agent, like a single media resource device.

In the control plane, gateways periodically send advertisement messages to their neighboring peers via L-4 connections for DSP resource management as well as gateway failure detection. An advertisement message is either ADD or REMOVE, with which each gateway reports its in-box DSP availability status. The granularity of the status is on the DSP-core level since each DSP core can process one media-service packet independently at a time. Using these advertisement messages and cascading updates based on flooding, the gateways in the DSP Cloud collaboratively maintain a shared record for all available DSP resources, while each keeps a local copy in soft state as follows:

(1) Each gateway on reboot or having some DSP insertion or restart immediately sends ADD to all neighboring peers via L-4 connections, with a timestamp. A gateway receiving an ADD from a neighbor updates its local record by the latest timestamp, and cascades the update to all neighbors except the sender. Note that no message looping will occur in this flooding mechanism since only the gateway possessing the DSP core can be the source of the ADD messages for that DSP core and increase the timestamps.

(2) Any detected local DSP failure or administrative removal is immediately sent to all neighbors using REMOVE with a timestamp, which is cascaded the same way as ADD, which prevents looping.

(3) Each gateway periodically refreshes all its DSP availability to neighbors using ADD messages as described in (1).

In the control plane, a consecutive number of timeouts, e.g. three, can detect the failure of that gateway CPU. If the failure of the proxy gateway is detected, all the remaining gateways again use an election algorithm to choose the succeeding proxy which will make a new registration to the control agent with the same aggregate DSP capacities. In an example embodiment, a new gateway joining the DSP Cloud does not trigger the election mechanism or change the proxy designation.

The data plane uses a layer-2 (L-2) VLAN, for example an Institute of Electrical and Electronics Engineers (IEEE) 802.1q Virtual LAN, can be implemented between gateway CPUs and DSP modules in the DSP Cloud. Any CPU of a gateway should be able to directly send a packet or frame to any DSP module through the VLAN for media-service processing. In particular embodiments, the I/O interrupts do not need to reach the CPU of the gateway where the DSP module receiving the packet is embedded.

In an example embodiment, one or more or even all gateways in a DSP Cloud can be selected by configuration to be the border group which will send and receive packets upon requests of the control agent for media-service streams. Using a configurable border group with multiple gateways offers scalability, regarding the growth of the number of the media streams. The implementation can use a round-robin, a scheduling algorithm employing load balancing, or any other suitable algorithm to determine which gateway in the border group is to handle packets of a particular media stream. The decision is per media-stream and reflected by the IP address and port number in the response back to the control agent which sets up the media stream with the endpoints. As the request from the control agent is always sent to the proxy gateway, an easy implementation would be to let the proxy gateway make all decisions based on a centralized algorithm, but an alternative implementation could still choose a decentralized algorithm that uses the control plane for communication. In a more complex implementation, the border group can further be categorized into ingress and egress, where the gateways in the ingress border group only receive packets while the egress gateways only send packets out.

Figure 1:
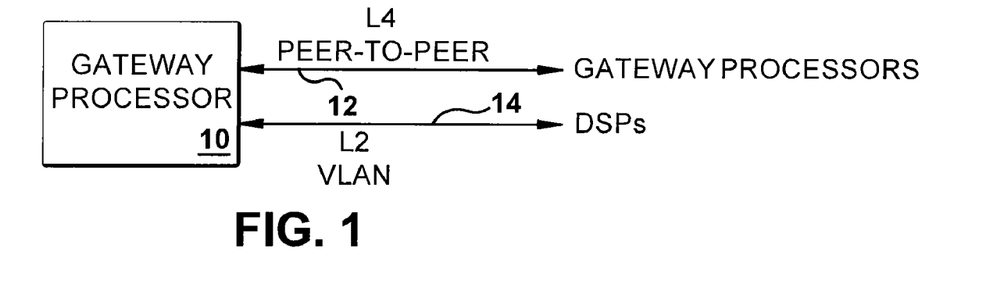
FIG. 1 illustrates an example of central processing logic configured in accordance with an example embodiment.

FIG. 1 illustrates an example of central processing logic 10 configured in accordance with an example embodiment. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. In the example embodiments described herein, central processing logic 10 may also be referred to as a gateway processor or gateway central processing unit (CPU) for ease of illustration; however those skilled in the art should readily appreciate that other forms of logic as just set forth can be employed wherever the terms gateway CPU are used.

In the example embodiment of FIG. 1, gateway processor 10 employs a Layer 4 peer-to-peer connection 12 to communicate with at least one other gateway processor associated with another apparatus (such as a second gateway server). Gateway processor 10 also employs a Layer 2 Virtual Local Area Network (VLAN) 14 to communicate with digital signal processing logic (or digital signal processors "DSPs"). The layers referred to herein comport with the Open Systems Interconnection (OSI) layers well known in the art, where layer 2 is the data link (or Media Access Control "MAC") layer and layer 4 is the Transport layer.

In an example embodiment, central processing logic 10 is further configured to continue communicating with the digital signal processing logic associated with the second server via the virtual local area network 14 after losing communication with the central processing logic of the second server. For example, although gateway processor 10 may lose the ability to communicate with the CPU of the second server via peer to peer connection 12, gateway processor 10 can still communicate with digital signal processing logic associated with the second processer by using layer 2 VLAN 14.

In an example embodiment, as will be further described other example embodiments herein, central processing logic 10 is further configured to communicate with a third server and select a proxy for communicating with a control agent responsive to losing communication with the central processing logic of the second server and determining the second server was the proxy established for communicating with the control agent. This prevents disruption of communications with the control agent as the failure of the server acting as a proxy for a DSP cluster is mitigated by selecting a new proxy.

In an example embodiment, central processing logic 10 is configured to periodically send data representative of a status of digital signal processor logic to the control agent responsive to the central processing logic being selected as the proxy. In particular embodiments, the data representative of a status of digital signal processor logic includes the status of any other server that central processing logic 10 is able to receive via peer-to-peer connection 14. For example, the data may include the status of digital signal processing logic associated with the second server.

In an example embodiment, while central processing logic 10 is acting as the proxy between a DSP cluster and the control logic, central processing logic 10 is configured to receive a setup message for a media-stream from the control agent. Central processing logic 10 is configured to allocate a digital signal processing logic responsive to the setup message. The digital signal processing logic may be any digital signal processor associated with any server in the cluster. Central processing logic 10 is configured to send a response to the setup message to the control agent. The address in the response sent to the control agent is the Layer-4 address for a central processing logic assigned to the border gateway selected from the border group for the media-service stream setup. The Layer-2 address for the allocated digital signaling processing logic is reported to the assigned border gateway's central processing logic, so that its CPU knows where to communicate with the allocated digital signaling processing logic for the media-service stream.

In an example embodiment, central processing logic 10 is configured to periodically receive data representative of a status of digital processing logic associated with a third server. Accordingly, the data sent to the control agent further comprises data representative of the status of digital signal processing logic associated with the third server.

In an example embodiment, central processing logic 10 is configured to send a periodic message with data representative of the status of the at least one digital signal processing logic to the central processing logic of the second server. In particular embodiments, if central processing logic 10 is coupled to more than one server via peer-to-peer connection 14, the periodic message is sent to each of server. The message may further comprise a timestamp. In an example embodiment, central processing logic 10 is configured to communicate with the central processing logic of the second server employing transmission control protocol (TCP) and/or user datagram protocol (UDP). In an example embodiment, central processing logic 10 is further configured to communicate with the central processing logic of the second server to perform load balancing between the at least one digital signal processing logic and digital signal processing logic associated with the second server.

In an example embodiment, central processing logic 10 is configured to receiving data representative of a status of digital signal processing logic associated with the second server from the central processing logic associated with the second server. Central processing logic 10 is responsive to receiving the data to propagate the data to all neighboring servers except for the second server.

In an example embodiment, central processing logic 10 is configured to propagate a remove message with data identifying a digital processing logic associated with the second server responsive to detecting failure of the digital signal processing logic associated with the second server. The remove message is propagated to all neighboring servers except for the second server. In particular embodiments, the remove message further comprises a timestamp.

In an example embodiment, as will be illustrated in other example embodiments illustrated herein, the at least one digital signal processing logic may include a plurality of digital signal processing cores. In particular embodiments, each core is configured with its own layer 2 address. In some embodiments, all of the cores of a digital signal processing logic may share the same layer-2 address; and in these embodiments the digital signaling processing logic can be configured to demultiplex the layer-2 packet/frame correctly to the proper core by a core identifier number in addition to the layer-2 address.

Figure 2:
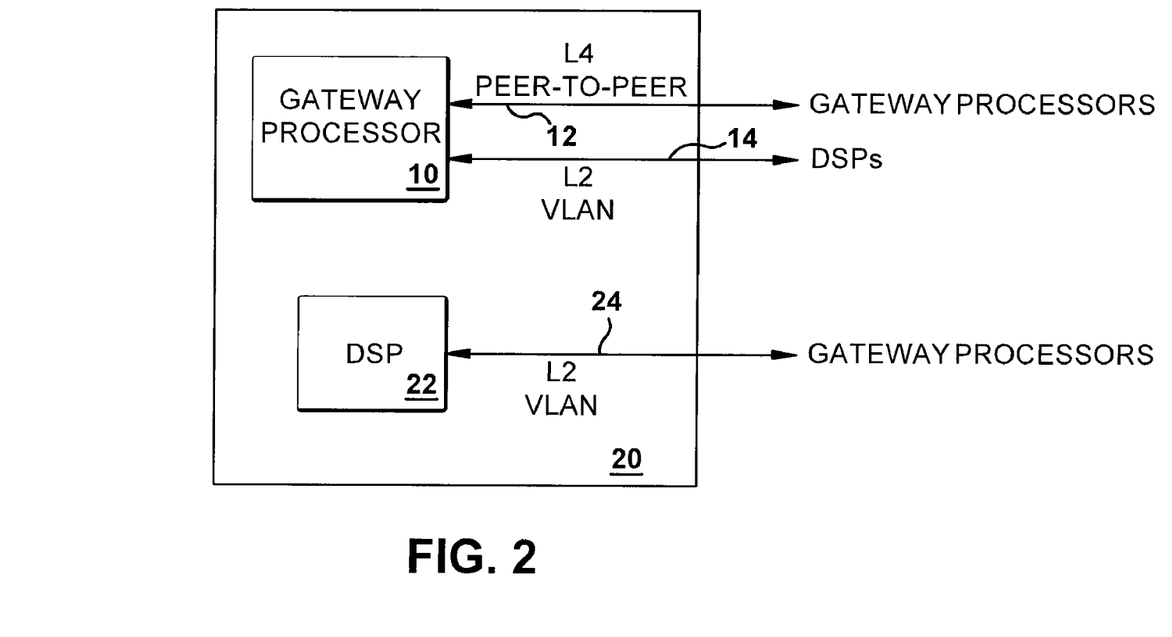
FIG. 2 illustrates an example of a gateway server configured in accordance with an example embodiment.

FIG. 2 illustrates an example of a gateway server 20 configured in accordance with an example embodiment. Gateway server 20 comprises a gateway processor (or central processing logic) 10 configured in accordance with an example embodiment described herein. Gateway processor 10 is configure to communicate with gateway processors associated with other gateway servers via peer-to-peer connection 12 and with DSPs associated with other gateway servers via VLAN 14. Gateway server 10 further comprises digital signal processing logic (referred to in this example as a Digital Signal Processor or "DSP") 22. DSP 22 is configured to communicate with the gateway processors associated with the other gateway servers via Layer 2 (L2) VLAN 24. Thus, in the event of failure of gateway processor 10, DSP 22 is still available to the other gateway servers.

Figure 3:
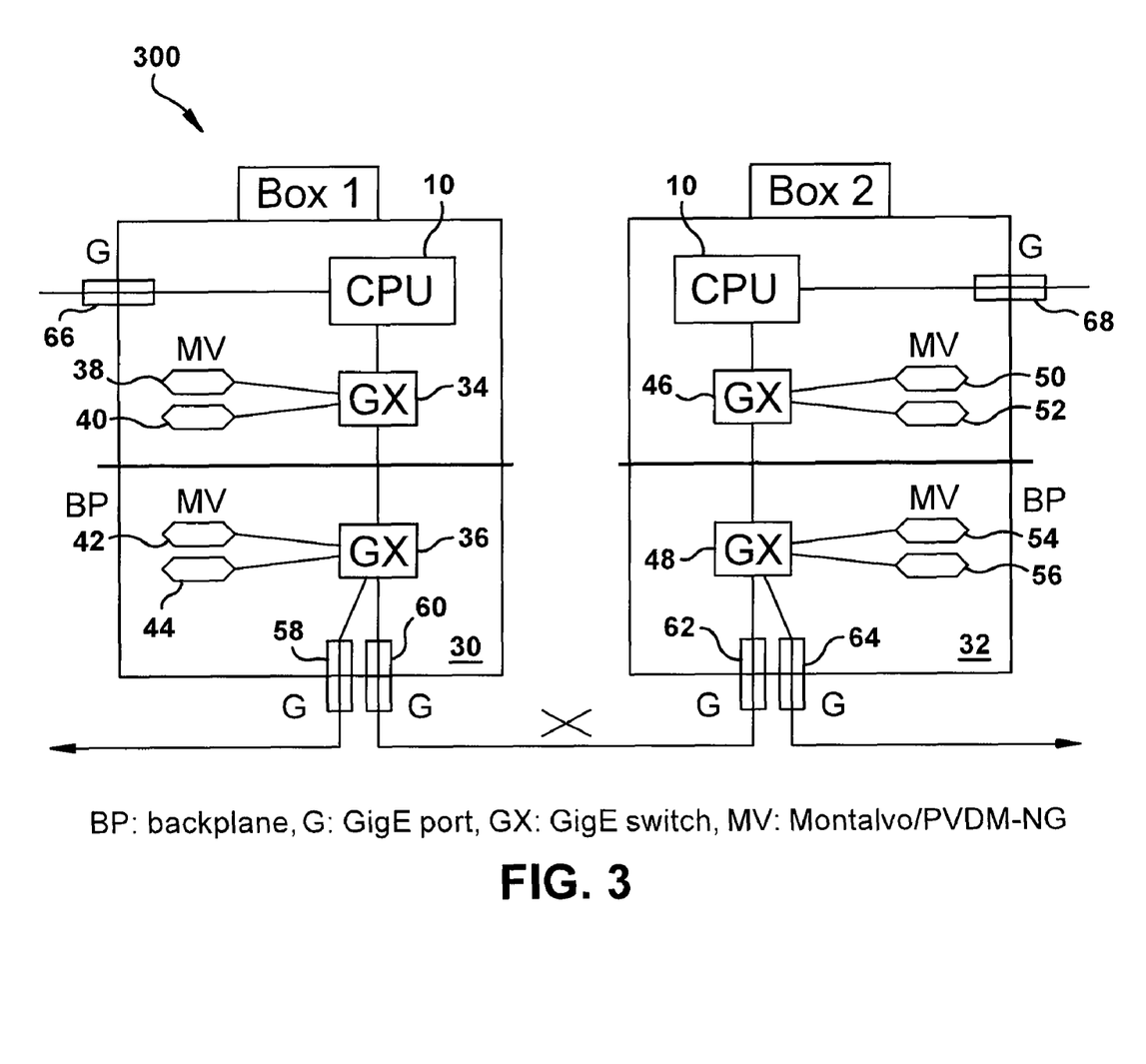
FIG. 3 illustrates an example of a pair of gateway servers configured in accordance with an example embodiment.

FIG. 3 illustrates an example 300 of a pair of gateway servers 30, 32 configured in accordance with an example embodiment. Gateway server 30 comprises a central processing unit 10, gigabit Ethernet (GigE or "GX") switches 34, 36, digital signal processors 38, 40 coupled to switch 34 and digital signal processors 42, 44 coupled to switch 36. GigE ports 58, 60 are also coupled to GigE switch 36. GigE port 66 is coupled to CPU 10 of gateway server 30. Gateway server 32 comprises a central processing unit 10, GigE switches 46, 48, digital signal processors 50, 52 coupled to GigE switch 46 and digital signal processors 54, 56 coupled to GigE switch 48. GigE ports 62, 64 are also coupled to GigE switch 48. In this illustrated example, GigE port 60 of gateway server 30 is coupled to GigE port 62 of gateway server 32. GigE port 68 is coupled to CPU 10 of gateway server 32.

Figure 4:
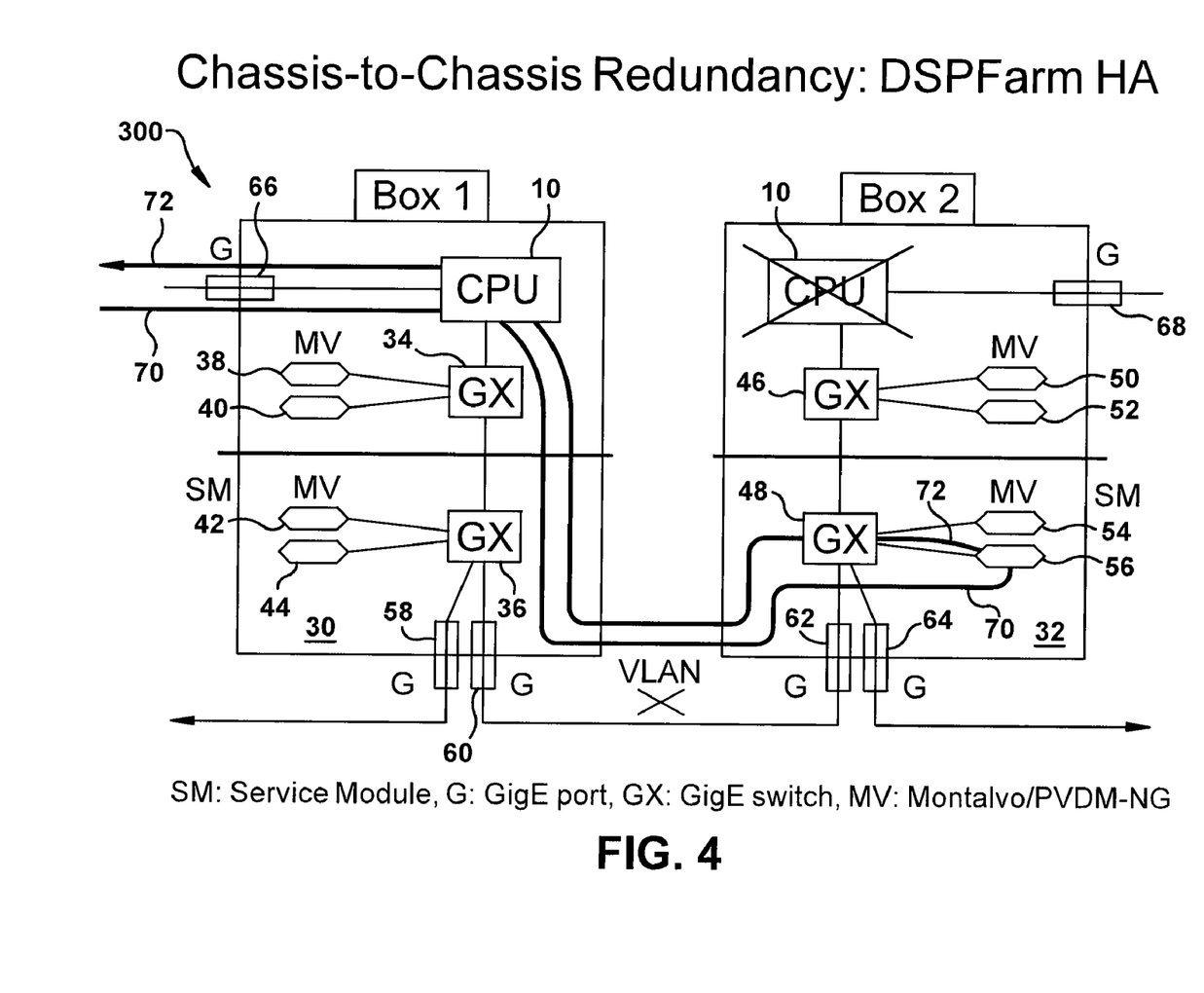
FIG. 4 illustrates an example of a first gateway server communicating with a second gateway server while the central processing unit of the second gateway server is unavailable.

Referring to FIG. 4 with continued reference to FIG. 3 there is illustrated an example of first gateway server 30 communicating with a digital signal processor 56 of second gateway server 32 while central processing unit 10 of the second gateway 32 server is unavailable/failed. As illustrated by 70, a stream is received at GigE port 70. CPU 10 (of gateway server 30) employs a layer 2 VLAN to route input stream 70 to GigE switch 34 that forwards input stream 70 to GigE switch 36, which forwards input stream 70 to GigE port 60 and routed to GigE port 62 of gateway server 32. From gateway port 62 input stream 70 is routed to GigE switch 48, which forwards input stream 70 to DSP 56. The processed stream 72 is routed by DSP 56 using the layer 2 VLAN to CPU 10 of gateway server 30. Processed stream 72 is forward by DSP 56 to GigE switch 48, GigE port 62, GigE port 60, switch 36 and switch 34 to CPU 10. CPU 10 then forwards processed stream 72 to GigE port 66. As illustrated by this example, even though CPU 10 of gateway server 32 is no longer functioning, DSPs 50, 52, 54, 56 are still available to CPU 10 of gateway 30 by using a layer 2 VLAN between CPU 10 of gateway 30 and DSPs 50, 52, 54 and 56.

Figure 5:
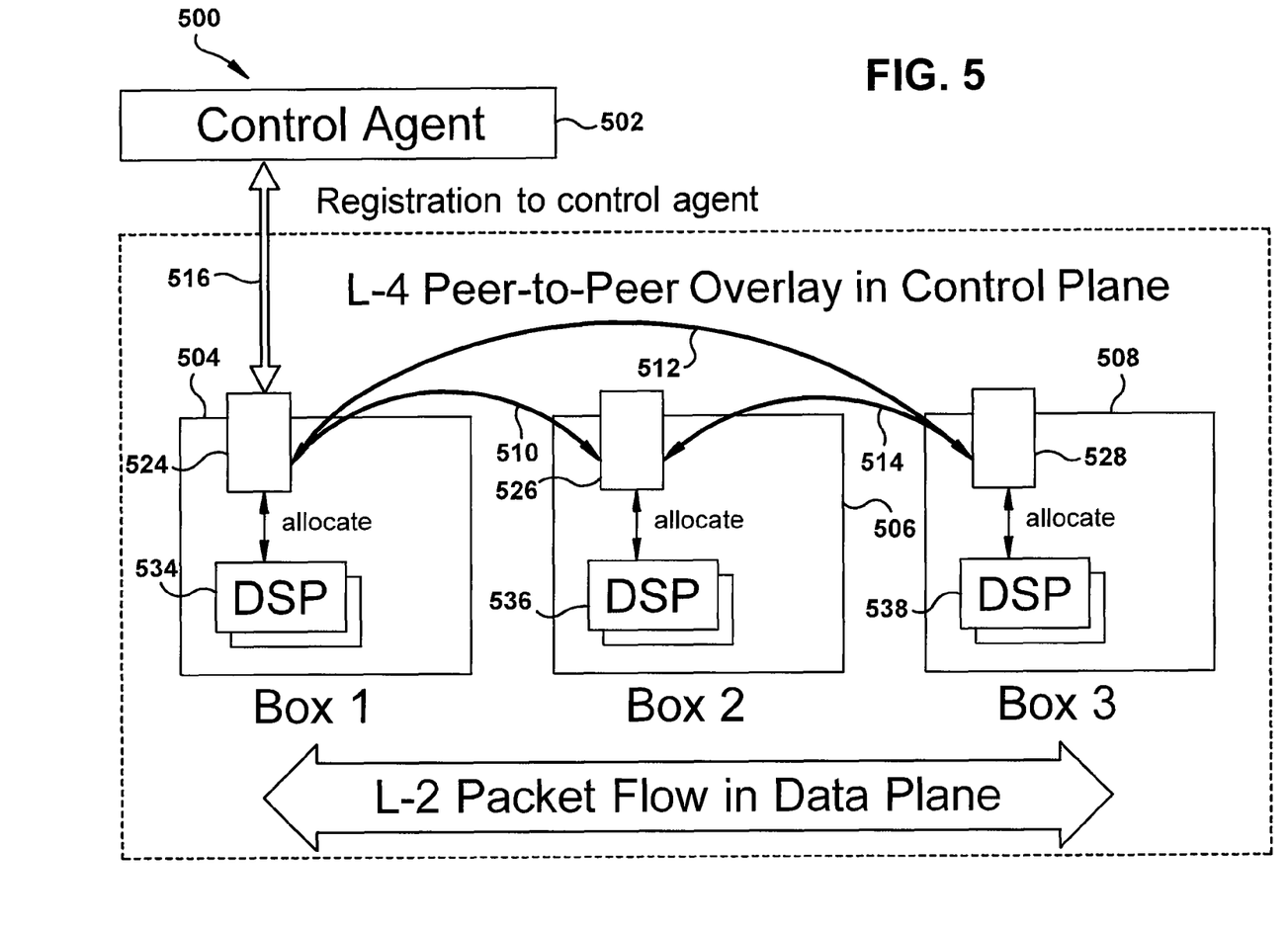
FIG. 5 illustrates an example of a gateway central processor units communicating using a peer to peer overlay in accordance with an example embodiment.

FIG. 5 illustrates an example a cluster 500 of gateway servers 504, 506, 508 where the a central processing logic 524, 526, 528 of gateway servers 504, 506, 508 respectively communicate with each other via a peer-to-peer overlay in accordance with an example embodiment. In this example, central processing logic 524 of gateway server 504 is acting as a proxy for the cluster of gateway servers 504, 506, 508 and communicates with control agent 502 as illustrated by 516. Central processing logic 524 communicates with central processing logic 526 of gateway server 506 via peer-to-peer connection 510. Central processing logic 524 communicates with central processing logic 528 of gateway server 508 via peer-to-peer connection 512. Central processing logic 526 of gateway server 506 communicates with central processing logic 528 of gateway server 508 via peer-to-peer connection 514.

In an example embodiment, central processing logic 524, 526, 528 periodically send messages to each other in order to verify that the gateway servers are still active. In an example embodiment, the periodic message is an ADD message as described herein. The periodic messages may also include data representative of the status of DSPs 534, 536, 538. As will be illustrated in the following examples, this configuration enables cluster 500 to remain available to control agent 502 even after failure of the central processing logic that is communicating with control agent 502. In addition, control agent 502 is provided with current data regarding the availability of DSPs 534, 536, 538.

Figure 6:
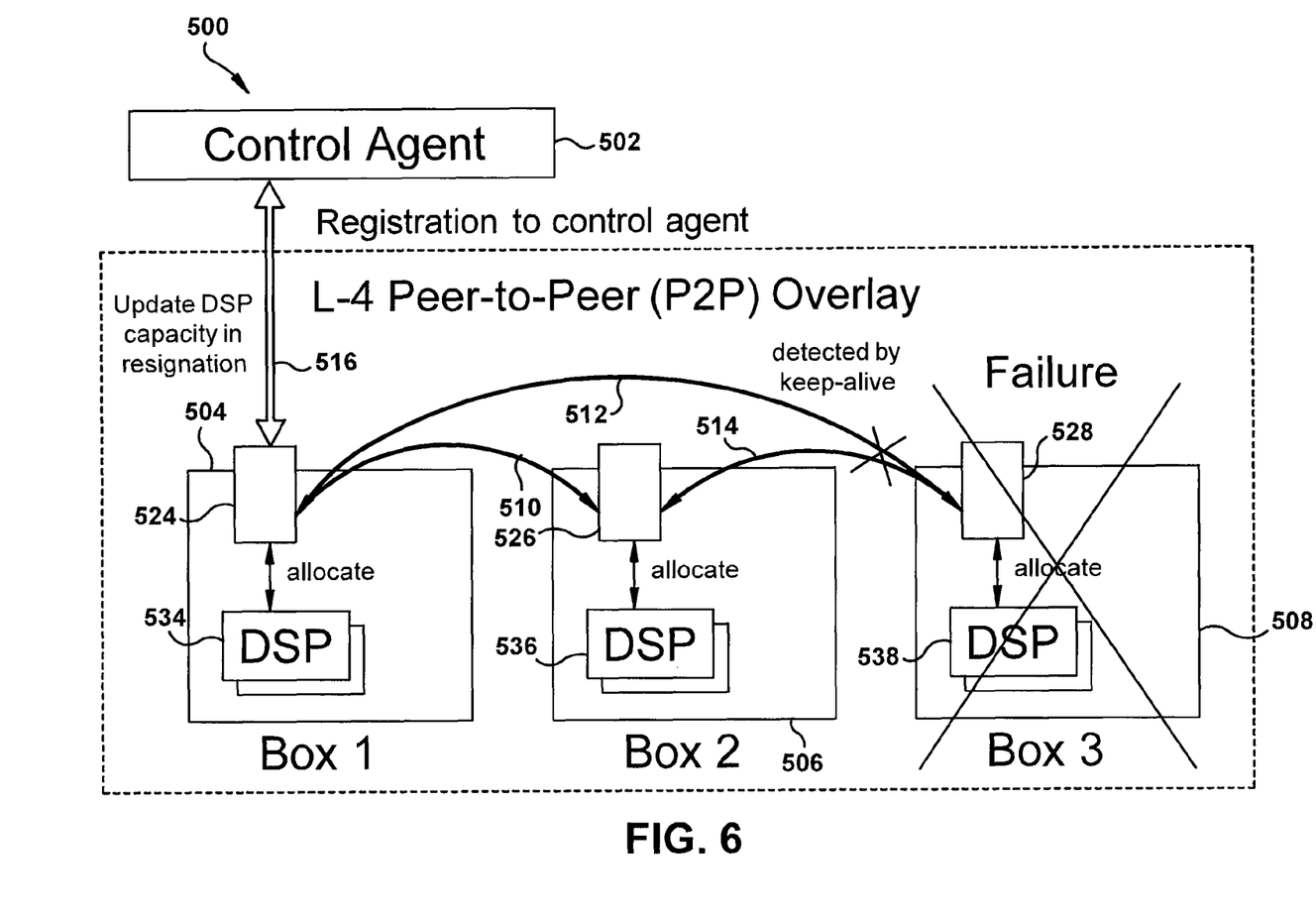
FIG. 6 illustrates an example of the gateway central processor units detecting a failure of a gateway central processor unit using a peer to peer overlay in accordance with an example embodiment.

For example, FIG. 6 illustrates an example of how cluster 500 reacts to failure of a gateway server, which in this example is gateway server 508. Central processing logic 524 detects a failure upon losing communication with central processing logic 528 via peer-to-peer connection 512. The failure may be detected by lack of keep alive (e.g. ADD) messages over a predefined time period, by failing to receive a response to one or more messages sent to gateway processing logic 528, and/or by receiving a message from central processing logic 528 (for example a REMOVE message as described herein) via peer-to-peer connection 512 indicating that gateway server 508 (and/or DSP 538) will be unavailable Central processing logic 526 may detect failure of gateway processing logic 528 (and/or DSP 538) by similar means via peer-to-peer connection 514. If DSP 538 is still functioning, data flow may continue via a layer 2 VLAN as described herein.

Figure 7:
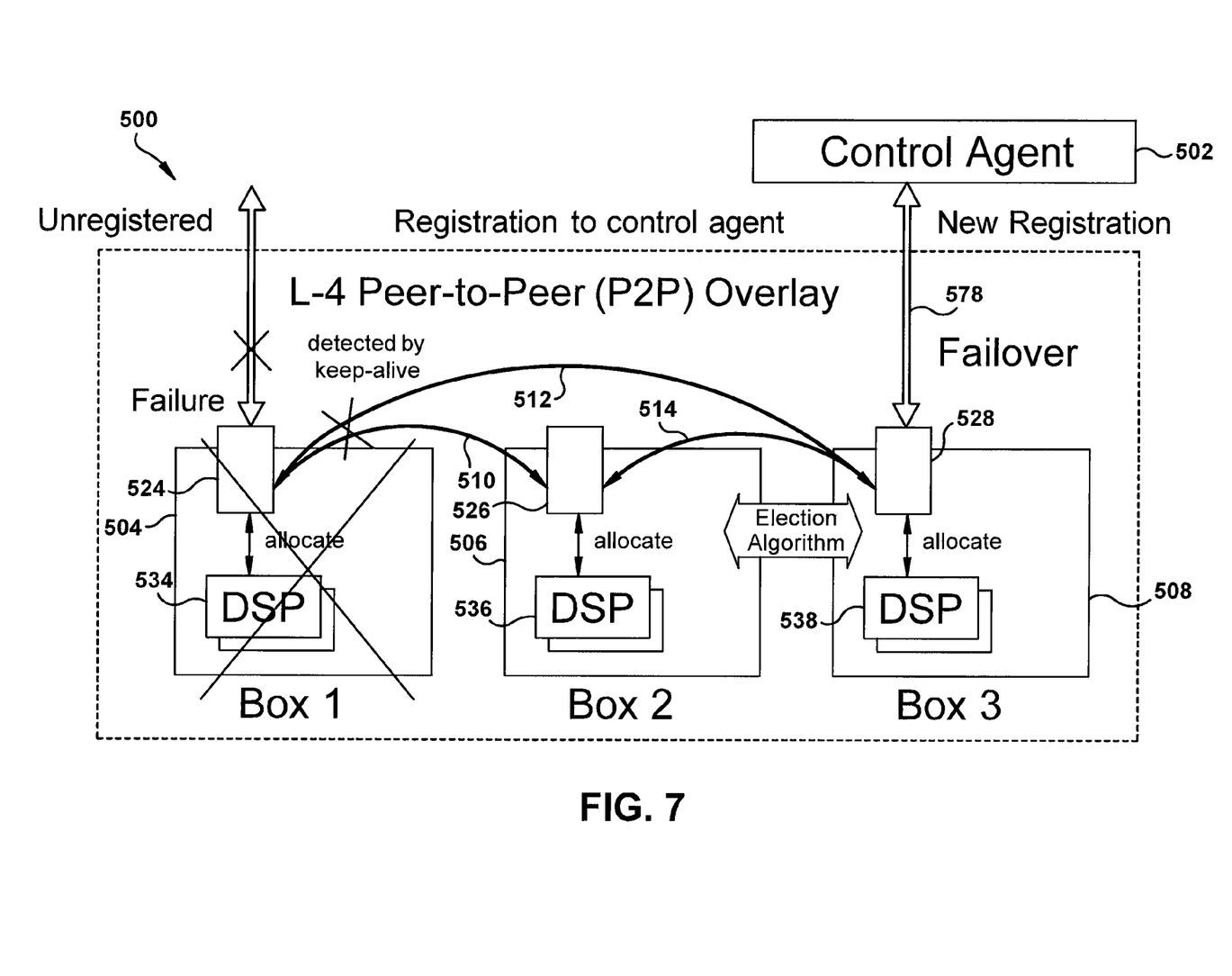
FIG. 7 illustrates an example of the gateway central processor units responding to a failure of a proxy gateway central processor unit that was communicating with a control agent in accordance with an example embodiment.

FIG. 7 illustrates an example of how cluster 500 reacts to the failure of the gateway server, gateway server 504 in this example, which is the proxy with control agent 502. Gateway processing logic 526, 528 detect the failure of gateway processing logic 524 via peer-to-peer overlay connections 510, 512 respectively. In an example embodiment, central processing logic of a gateway server responsive to detecting a failure, propagates a message to the remaining gateway servers (for example if central processing logic 526 detects a failure of central processing logic 524, central processing logic 526 sends a message to central processing logic 528 reporting the failure. The message for reporting a detected failure of a neighboring gateway's CPU may be propagated by a flooding mechanism using the layer-4 peer-to-peer overlay communication. In particular embodiments the message includes a timestamp to avoid looping of the message. Message flooding is used if the failing CPU is for the proxy gateway. In such a case, a new proxy gateway needs to be elected from the remaining gateways, triggered by the message flooding. Otherwise, the detected failure for a non-proxy gateway does not need to be reported by flooding to all remaining gateways, unless it causes a loss of the peer-to-peer overlay connectivity (due to the loss of the failing gateway in layer-4) and the loss is repaired by adding extra layer-4 connections, which may depend on the implementation of the chosen peer-to-peer overlay protocol.

In an example embodiment, upon detecting the failure of a gateway server, the remaining gateway servers elect a new proxy to communicate with the control agent. The election may be by any suitable means. For example, the server with the lowest media access control (MAC) address may be elected. In the illustrated example, upon detection of the failure of central processing logic 524, central processing logic 528 is elected as the new proxy and registers with control agent 502 as illustrated by 578. After the election, central processing logic 528 will periodically report the status of DSPs 534, 536, 538, and respond to setup messages sent by control agent 502.

Figure 8:
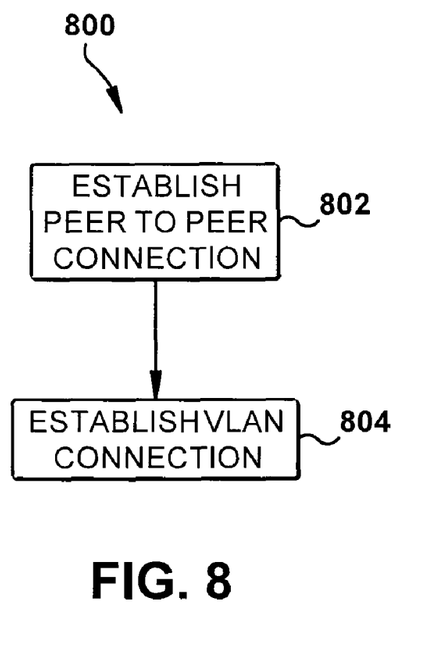
FIG. 8 illustrates an example of a methodology for gateway servers to communicate in accordance with an example embodiment.
Figure 9:
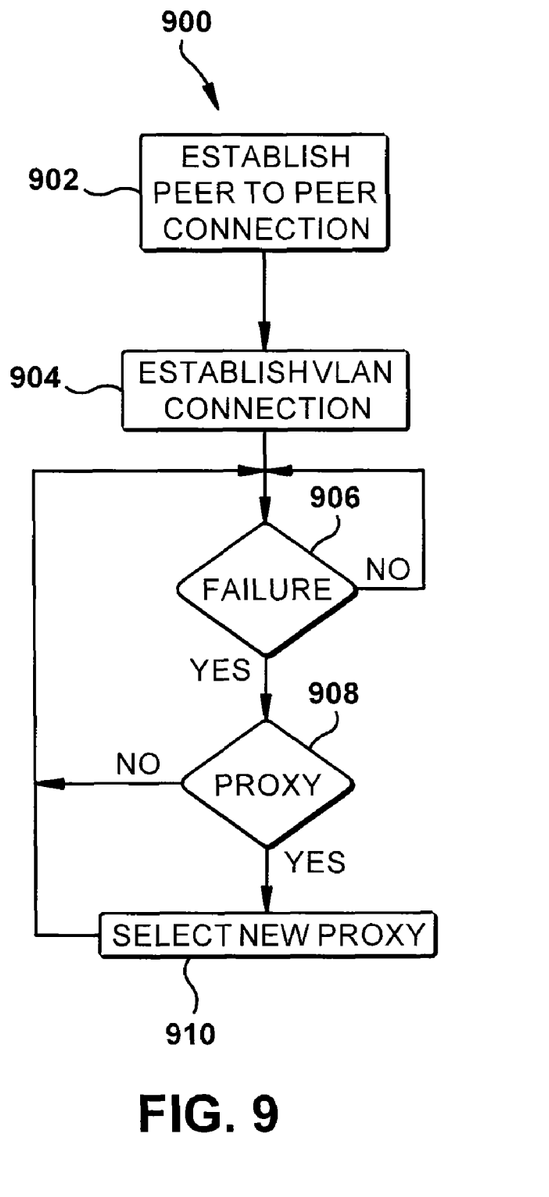
FIG. 9 illustrates an example methodology for responding to a failure of a gateway server by a cluster of gateway servers.

In view of the foregoing structural and functional features described above, methodologies in accordance with example embodiments will be better appreciated with reference to FIGS. 8 and 9. While, for purposes of simplicity of explanation, the methodologies of FIGS. 8 and 9 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement any methodology described herein in. The methodologies described herein are suitably adapted to be implemented in hardware, software, or a combination thereof.

FIG. 8 illustrates an example of a methodology 800 for gateway servers to communicate in accordance with an example embodiment. At 802, a central processing unit of a first server establishes a peer to peer connection with a central processing unit associated with a second server. The peer-to-peer connection may be a layer 4 peer-to-peer overlay connection.

At 804, at least one virtual local area network (VLAN) connection is established. For example, a layer 2 virtual local area network connection may be established by the central processing unit of the first server with a digital signal processor associated with the second server. This configuration enables the central processing unit of the first server to communicate with the digital signal processor of the second server without going through the central processing unit of the second server, and thus the connection may not be affected by failures or availability of the central processing unit of the second server.

In addition, a layer 2 virtual local area network connection may be established between a digital signal processor associated with the first server and the central processing unit associated with the second server. Thus, the central processing unit of the second server may still communicate with the digital signal processor of the first server in the event of a failure or other unavailability of the central processing unit of the first server.

FIG. 9 illustrates an example methodology 900 for responding to a failure of a gateway server by a cluster of gateway servers. At 902, a central processing unit of a first server establishes a peer to peer connection with a central processing unit associated with a second server. The peer-to-peer connection may be a layer 4 peer-to-peer overlay connection.

At 904, at least one virtual local area network (VLAN) connection is established. For example, a layer 2 virtual local area network connection may be established by the central processing unit of the first server with a digital signal processor associated with the second server. This configuration enables the central processing unit of the first server to communicate with the digital signal processor of the second server without going through the central processing unit of the second server, and thus the connection may not be affected by failures or availability of the central processing unit of the second server.

In addition, a layer 2 virtual local area network connection may be established between a digital signal processor associated with the first server and the central processing unit associated with the second server. Thus, the central processing unit of the second server may still communicate with the digital signal processor of the first server in the event of a failure or other unavailability of the central processing unit of the first server.

At 906, a determination is made if whether one of the gateway servers or gateway server central processing unit has failed. For example, as explained herein, a failure may detected by not receiving any communication from the central processing unit for longer than a predefined time period, by lack of a response to a communication sent to the central processing unit and/or in response to a message (such as a REMOVE message as described herein) sent by the central processing unit indicating the central processing unit is unavailable. If no failures are detected (NO), no further action is taken.

If, however, at 906 a failure of a central processing unit and/or gateway server is detected (YES), communication with a digital signal processor associated with the gateway server may continue on via the established VLAN connection. A determination is made as to whether the failed central processing unit/gateway server is the proxy with a control agent for the cluster. If the central processing unit/gateway server was not the proxy (NO) then no further action needs to be taken.

If at 908, it is determined that the failed central processing unit/gateway server was the proxy to the control agent (YES), at 910 a new proxy is selected. The new proxy can be selected by any suitable means. For example, the gateway server with the lowest (or highest) MAC address may be selected.

The actions and/or steps of methodology 900 may be repeated as often as necessary. For example, if a new gateway server is added to the cluster, 902, 904 may again be executed. If a gateway server and/or central processing unit exits from the cluster, 906, 908, 910 may again be executed.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations. that fall within the spirit and scope of the appended claims interpreted in accordance with the breadth to which they are fairly, legally and equitably entitled.

The invention claimed is:

1. An apparatus, comprising:
a gateway host central processor; and
at least one digital signal processor;
wherein the gateway host central processor is configured to communicate with a gateway host central processor of an external server employing a peer to peer communication protocol;
wherein the a gateway host central processor is configured to communicate with a digital signal processor associated with the external server via a virtual local area network;
wherein the at least one digital signal processor is configured to communicate with the gateway host central processor of the external server via a virtual local area network;
wherein the gateway host central processor is configured to propagate a remove message with data identifying a digital signal processor associated with the external server responsive to detecting failure of the digital signal processor associated with the external server;
wherein the remove message is propagated to all neighboring servers except for the external server; and
wherein the remove message further comprises a timestamp.

2. The apparatus of claim 1, wherein the gateway host central processor is further configured to continue communicating with the digital signal processor associated with the external server via the virtual local area network after losing communication with the central processor of the external server.

3. The apparatus of claim 2, wherein the gateway host central processor is further configured to communicate with a second external server and select a proxy for communicating with a control agent responsive to losing communication with the a gateway host central processor of the first external server and determining that the first external server was the proxy established for communicating with the control agent.

4. The apparatus of claim 3, wherein the gateway host central processor is configured to periodically send data representative of a status of digital signal processor logic to the control agent responsive to the a gateway host central processor being selected as the proxy.

5. The apparatus of claim 4, wherein the gateway host central processor is configured to receive a setup message from the control agent;
wherein the gateway host central processor is configured to allocate a digital signal processor responsive to the setup message; and
wherein the gateway host central processor is configured to send a response to the setup message, the response comprising data representative of an address for the allocated digital signal processor to the control agent.

6. The apparatus of claim 5, wherein the address for the allocated digital signal processor comprises an Internet Protocol address and a port number.

7. The apparatus of claim 4, wherein the gateway host central processor is configured to periodically receive data representative of a status of digital processor associated with the second external server
wherein the data periodically sent to the control agent further comprises data representative of the status of digital signal processor associated with the second external server.

8. The apparatus of claim 1, wherein the gateway host central processor is configured to send a periodic message with data representative of the status of the at least one digital signal processor to the central processor of the second server.

9. The apparatus of claim 8, wherein the message further comprises a timestamp.

10. The apparatus of claim 1, wherein the gateway host central processor is configured to communicate with the gateway host central processor of the second server employing a transmission control protocol.

11. The apparatus of claim 1, wherein the gateway host central processor is configured to communicate with the gateway host central processor of the external server employing a user datagram protocol.

12. The apparatus of claim 1, wherein the gateway host central processor is further configured to communicate with the gateway host central processor of the external server to perform load balancing between the at least one digital signal processor and digital signal processor associated with the external server.

13. The apparatus of claim 1, wherein the gateway host central processor is responsive to receiving data representative of a status of digital signal processor associated with the external server from the central processor associated with the external server to propagate the data to all neighboring servers except for the external server.

14. The apparatus of claim 1, wherein the at least one digital signal processor further comprises a plurality of digital signal processing cores wherein each core has its own layer 2 address.

15. A method, comprising:
establishing a peer to peer connection by a central processing unit associated with a first server and to a central processing unit associated with a second server;
establishing a layer 2 virtual local area network connection with the central processing unit associated with the first server to a digital signal processor associated with the second server;
establishing a layer 2 virtual local area network connection between a digital signal processor associated with the first server and the central processing unit associated with the second unit;
detecting a failure of the digital signal processor associated with the second server by the central processing unit associated with the first server;
sending a remove message with data identifying the digital signal processor associated with the second server responsive to detecting the failure of the digital signal processor associated with the external server by the central processing unit associated with the first server; and
wherein the remove message is propagated to all neighboring servers except for the second server and wherein, and wherein the remove message further comprises a timestamp.

16. The method set forth in claim 15, further comprising:
detecting a failure of the central processing unit associated with the second server; and
continuing to communicate with the digital signal processor associated with the second server via the layer 2 virtual local area network responsive to detecting the failure of the central processing unit associated with the second server.

17. The method of claim 15, further comprising:
detecting a failure of the central processing unit associated with the second server;
determining whether the second server was a proxy with a control agent responsive to detecting the failure; and
selecting a new proxy for communicating with the control agent responsive to detecting the failure of the central processing unit associated with the second server and determining that the second server was a proxy with the control agent.

18. Logic encoded on at least one non-transitory tangible media for execution and when executed operable to:
establishing a peer to peer connection between a central processing unit of a first server and a central processing unit associated with a second server;
establishing a layer 2 virtual local area network connection between the central processing unit associated with the first server and a digital signal processor associated with the second server;
establishing a layer 2 virtual local area network connection between a digital signal processor associated with a first server and the central processing unit associated with the second unit;
detecting a failure of the central processing unit associated with the second server;
continuing to communicate with the digital signal processor associated with the second server via the layer 2 virtual local area network response to detecting the failure of the central processing unit associated with the second server; and
sending a remove message with data identifying a digital signal processor associated with the second server responsive to detecting failure of the digital signal processor associated with the second server;
wherein the remove message is propagated to all neighboring servers except for the second server; and
wherein the remove message further comprises a timestamp.

19. A system, comprising:
a first server comprising a host central processing unit and at least one digital signal processor;
a second server comprising a host central processing unit and at least one digital signal processor;
wherein host the central processor units of the first and second servers employ a peer to peer communication protocol to communicate with each other;
wherein the host central processor unit of the first server employs a virtual local area network (VLAN) to communicate with the second server's at least one digital signal processor;
wherein the host central processor unit of the second server employs a VLAN to communicate with the first server's at least one digital signal processor; and
wherein the host central processing unit of the first server continues to employ the VLAN to communicate with the second server's at least one digital signal processor while the host central processing unit of the first server is unable to communicate with the second server's host central processing unit;

wherein the host central processing unit of the first server is operable to propagate a remove message with data identifying a digital processor associated with the second server responsive to detecting failure of the digital signal processor associated with the second server;

wherein the remove message is propagated to all neighboring servers except for the second server; and wherein the remove message further comprises a timestamp.

20. The system of claim 19, further comprising:
a third server comprising a host central processing unit and at least one digital signal processor;

wherein the third server's host central processing unit employs a peer to peer network communicating with the host central processors of the first and second servers;

wherein the third server's host central processing unit employs the VLAN to communicate with the first server's at least one digital signal processor and the second server's at least one digital signal processor;

wherein the third server's at least one digital signal processor employs the VLAN to communicate with the host central processing units of the first and second servers.

\* \* \* \* \*